US012641101B2

(12) United States Patent
Bechara Prado et al.

(10) Patent No.: US 12,641,101 B2
(45) Date of Patent: May 26, 2026

(54) EXPLORING ASSOCIATION RULES TO AID IN THE TRACKABILITY OF ROOT CAUSES OF ABNORMAL EVENTS AND IN THE GENERATION OF MORE PRECISE AND CONCISE EXPLANATIONS FOR ANOMALY DETECTION TECHNIQUES

(71) Applicant: Dell Products L.P., Round Rock, TX (US)

(72) Inventors: Adriana Bechara Prado, Niterói (BR); Alexander Eulalio Robles Robles, Valinhos (BR); Eduarda Tatiane Caetano Chagas, Belo Horizonte (BR); Helen Cristina de Mattos Senefonte, Londrina (BR); Jonathan Mendes De Almeida, Brasília (BR); Karen Stéfany Martins, Belo Horizonte (BR)

(73) Assignee: Dell Products L.P., Round Rock, TX (US)

( * ) Notice: Subject to any disclaimer, the term of this patent is extended or adjusted under 35 U.S.C. 154(b) by 305 days.

(21) Appl. No.: 18/496,333

(22) Filed: Oct. 27, 2023

(65) Prior Publication Data
US 2025/0141897 A1 May 1, 2025

(51) Int. Cl.
*H04L 9/40* (2022.01)
(52) U.S. Cl.
CPC .............................. *H04L 63/1425* (2013.01)

(58) Field of Classification Search
CPC ................................................. H04L 63/1425
See application file for complete search history.

(56) References Cited

U.S. PATENT DOCUMENTS

| | | | | |
|---|---|---|---|---|
| 10,958,689 | B1 * | 3/2021 | Ganesan ................ | G06N 20/00 |
| 11,206,277 | B1 * | 12/2021 | Oh .......................... | H04L 63/20 |
| 2022/0113888 | A1 * | 4/2022 | Cady ................... | G06F 11/3419 |
| 2022/0413907 | A1 * | 12/2022 | Sekiya ................... | G16Y 20/00 |
| 2024/0259409 | A1 * | 8/2024 | Allouche ............ | H04L 63/1425 |

OTHER PUBLICATIONS

C. C. M. Yeh et al., "Matrix Profile I: All pairs similarity joins for time series: a unifying view that includes motifs, discords and shapelets", Proc' of 16th IEEE ICDM, 2016, pp. 1317-1322.

(Continued)

*Primary Examiner* — Ryan J Jakovac
(74) *Attorney, Agent, or Firm* — Workman Nydegger

(57) ABSTRACT
One example method includes evaluating a set of itemsets, based on the evaluating, computing association rules corresponding to the itemsets, filtering the association rules to identify relevant association rules, sorting the relevant association rules according to their respective metrics of support, confidence, lift, and conviction, and the relevant association rules are sorted from best metrics to worst metrics, storing (1) best itemsets of the set of itemsets, and (2) the association rules with the best metrics, as thresholds, mapping the thresholds to the stored association rules and to feature-value ranges, and identifying the stored association rules and the feature-value ranges as root causes of an anomaly, and explanations of the anomaly, respectively.

20 Claims, 12 Drawing Sheets

(56) References Cited

OTHER PUBLICATIONS

Dell Invention Disclosure. 133149. "A framework to aid in the selection of thresholds for anomaly detection models, along with the generation of quantitative explanations". 2023.

P. Bailis, E. Gan, S. Madden, D. Narayanan, K. Rong, and S. Suri, "MacroBase: Prioritizing Attention in Fast Data." arXiv, Mar. 24, 2017. doi: 10.48550/arXiv.1603.00567.

J. Han, J. Pei, and Y. Yin. Mining frequent patterns without candidate generation. In SIGMOD, 2000.

Ribeiro, Marco Tulio, Sameer Singh, and Carlos Guestrin. "Why should i trust you?" Explaining the predictions of any classifier. Proceedings of the 22nd ACM SIGKDD international conference on knowledge discovery and data mining. 2016.

Lundberg, Scott M., and Su-In Lee. "A unified approach to interpreting model predictions." Advances in neural information processing systems 30 (2017).

V. Jacob, F. Song, A. Stiegler, B. Rad, Y. Diao, and N. Tatbul, "Exathlon: A Benchmark for Explainable Anomaly Detection over Time Series." arXiv, Sep. 5, 2021. doi: 10.48550/arXiv.2010.05073.

J. M. DeAlmeida et al., "Abnormal Behavior Detection Based on Traffic Pattern Categorization in Mobile Networks," IEEE Transactions on Network and Service Management, vol. 18, No. 4, pp. 4213-4224, Dec. 2021, doi: 10.1109/TNSM.2021.3125019.

A. Maske and B. Joglekar, "Survey on Frequent Item-Set Mining Approaches in Market Basket Analysis," in 2018 Fourth International Conference on Computing Communication Control and Automation (ICCUBEA), Aug. 2018, pp. 1-5. doi: 10.1109/ICCUBEA. 2018.8697776.

* cited by examiner

| support | itemsets | risk_ratio | cardinality |
|---|---|---|---|
| 0.833333 | (13_9, 14_9, 16_9) | 332.000000 | 3 |
| 0.833333 | (14_9, 16_9) | 332.000000 | 2 |
| 0.833333 | (13_9, 14_9) | 332.000000 | 2 |
| 0.833333 | (13_9, 16_9) | 332.000000 | 2 |
| 0.833333 | (16_9) | 275.833333 | 1 |
| 0.833333 | (13_9) | 275.833333 | 1 |
| 0.833333 | (14_9) | 193.235294 | 1 |
| 0.583333 | (17_9, 13_9, 14_9, 16_9) | 133.400000 | 4 |
| 0.583333 | (17_9, 13_9, 14_9) | 133.400000 | 3 |
| 0.583333 | (17_9, 13_9, 16_9) | 133.400000 | 3 |
| 0.583333 | (17_9, 14_9, 16_9) | 133.400000 | 3 |
| 0.583333 | (17_9, 13_9) | 133.400000 | 2 |
| 0.583333 | (17_9, 14_9) | 133.400000 | 2 |
| 0.583333 | (17_9, 16_9) | 116.550000 | 2 |
| 0.583333 | (17_9) | 116.550000 | 1 |
| 0.500000 | (13_9, 16_9, 15_9, 14_9, 17_9) | 111.333333 | 5 |

```
{
    "important_fts":[
        13,
        16,
        14
    ],
    "anomalous_ranges":[
        [
            0.03230042299106038,
            Infinity
        ],
        [
            0.0333520248030854408,
            Infinity
        ]'
        [
            0.032852177741645575,
            Infinity
        ]
    ]
}
```

| antecedents | consequents | antecedent support | consequent support | support | confidence |
|---|---|---|---|---|---|
| (14_9) | (16_9) | 0.833333 | 0.833333 | 0.833333 | 1.0 |
| (16_9) | (14_9) | 0.833333 | 0.833333 | 0.833333 | 1.0 |
| (13_9) | (14_9) | 0.833333 | 0.833333 | 0.833333 | 1.0 |
| (14_9) | (13_9) | 0.833333 | 0.833333 | 0.833333 | 1.0 |
| (13_9) | (16_9) | 0.833333 | 0.833333 | 0.833333 | 1.0 |
| ... | ... | ... | ... | ... | ... |
| (15_9, 13_9) | (17_9, 14_9, 16_9) | 0.500000 | 0.583333 | 0.500000 | 1.0 |
| (15_9, 16_9) | (17_9, 13_9, 14_9) | 0.500000 | 0.583333 | 0.500000 | 1.0 |
| (15_9, 14_9) | (17_9, 13_9, 16_9) | 0.500000 | 0.583333 | 0.500000 | 1.0 |
| (15_9, 17_9) | (13_9, 14_9, 16_9) | 0.500000 | 0.583333 | 0.500000 | 1.0 |
| (15_9) | (17_9, 13_9, 14_9, 16_9) | 0.500000 | 0.583333 | 0.500000 | 1.0 |

502    504    506    508    510    512

500

```
{
    "important_fts":[
        13,
        16,
        14
    ],
    "anomalous_ranges":[
        [
            0.03230042299106038,
            Infinity
        ],
        [
            0.03335202480308544,
            Infinity
        ],
        [
            0.032852177741645575,
            Infinity
        ]
    ],
    "antecedent_fts":[
        14
    ],
    "antecedent_ranges":[
        [
            0.03335202480308544,
            Infinity
        ]
    ],
    "consequent_fts":[
        16
    ],
    "consequent_ranges":[
        [
            0.032852177741645575,
            Infinity
        ]
    [
{
```

| TECHNIQUE | CONCISENESS | CONSISTENCY | PRECISION | RECALL | F1 |
|---|---|---|---|---|---|
| MATRIX PROFILE | 3.75 | 1.41 | 0.66 | 0.84 | 0.65 |
| MATRIX PROFILE + ASSOCIATION RULES | 3.13 | 1.43 | 0.76 | 0.73 | 0.64 |

FIG. 10

EXPLORING ASSOCIATION RULES TO AID IN THE TRACKABILITY OF ROOT CAUSES OF ABNORMAL EVENTS AND IN THE GENERATION OF MORE PRECISE AND CONCISE EXPLANATIONS FOR ANOMALY DETECTION TECHNIQUES

FIELD OF THE INVENTION

Embodiments of the present invention generally relate to identification, in a set of data, anomalies and their causes. More particularly, at least some embodiments of the invention relate to systems, hardware, software, computer-readable media, and methods, for use of association rules to identify anomalies, and generation of explanations for results obtained with anomaly detection techniques.

BACKGROUND

Anomaly detection (AD) techniques have been extensively proposed in the literature. Particularly, AD is useful in implementing a Zero Trust (ZT) ecosystem, where the idea is to prevent everything that is different from the "known good." Considering ZT scenarios, AD systems focus on identifying abnormal events in time series data and generating alerts for security teams. However, due to the possibility of a high number of false alerts, discovering anomalous events without any justification hinders the remediation process. In other words, the AD technique must explain why, in terms of the characteristics of the time series in question, certain events were classified as normal or abnormal. In this context, Explainable AI (XAI) is useful to identify whether an event is a true anomaly and take actions to remediate it.

Clear and concise explanations empower end-users to understand the conclusions of the AD solution and how to remediate the problem. Concomitantly, the evaluation of such explanations via quantitative metrics, such as conciseness, consistency, and accuracy, is useful to enable proper comparison among XAI techniques. Without quantitative metrics, it may not be possible to evaluate which AD technique is better suited for a particular scenario.

Interpretable methods that depend on user-defined thresholds to detect anomalies, such as Matrix Profile, fail to provide quantitative metrics for explanations since their output is a proxy for outlier scores. More specifically, in these methods, the chosen thresholds have a direct impact on the AD performance due to the fact that an instance is classified as abnormal based on user-defined thresholds. Furthermore, the interpretability of such methods is entirely based on visual analyses of outlier values, which hinders the comparison with other types of methods. In this context, the ability to derive actionable explanations from visual-based information is generally left aside in favor of the effectiveness of the anomaly detection process.

As the foregoing thus makes clear, in order to better exploit explainable AD methods and fill these gaps, it is helpful to be able to define well suited thresholds and provide clear and concise explanations.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 4 discloses an example of an explanation generated based only on frequent itemsets.

FIG. 6 discloses an example output from Phase 3 of an embodiment.

FIG. 10 discloses a table of experimental results, according to an embodiment.

DETAILED DESCRIPTION OF SOME EXAMPLE EMBODIMENTS

Figure 1A:
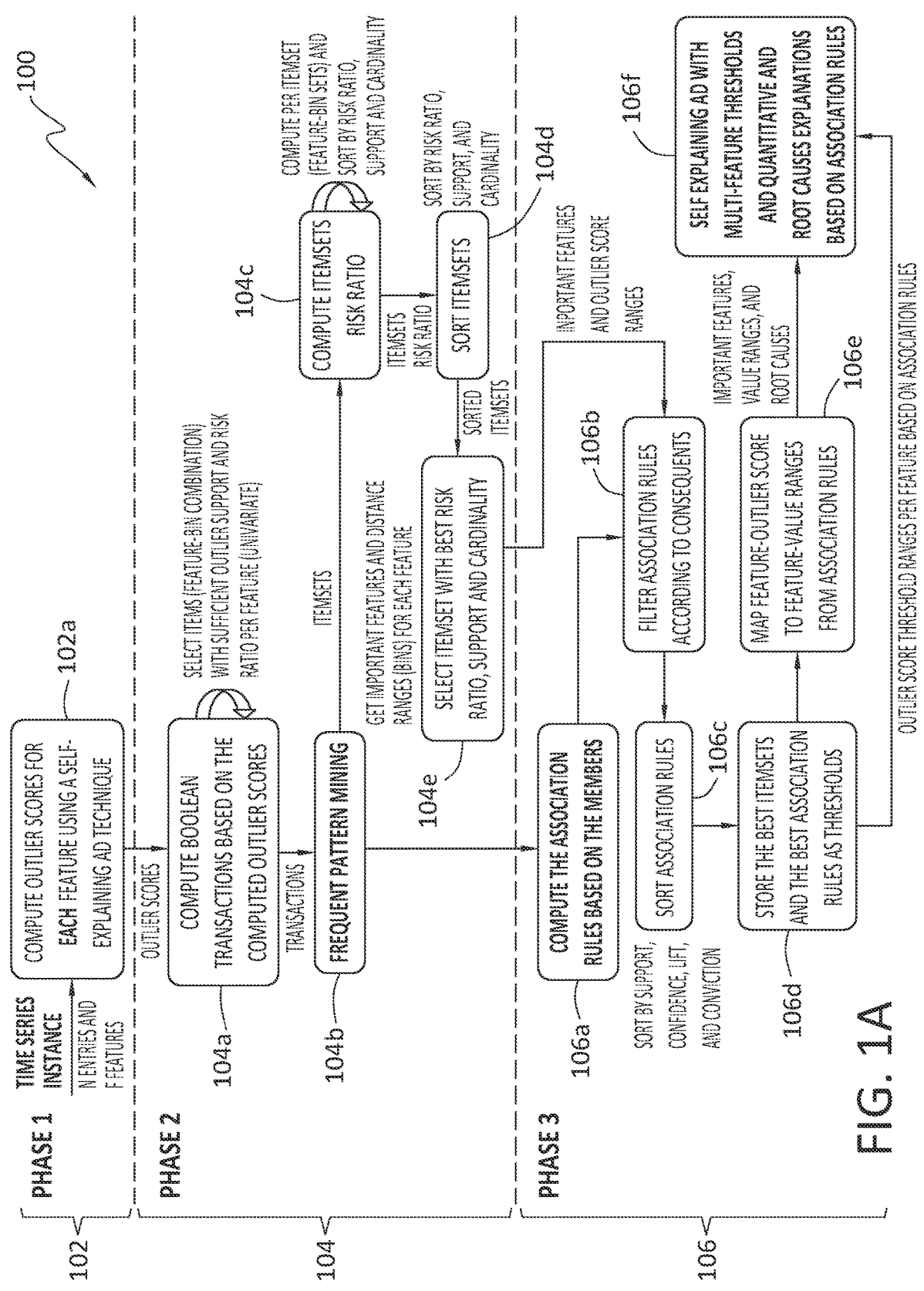
FIG. 1a discloses aspects of a framework and method, according to one embodiment.

Embodiments of the present invention generally relate to identification, in a set of data, anomalies and their causes. More particularly, at least some embodiments of the invention relate to systems, hardware, software, computer-readable media, and methods, for use of association rules to identify anomalies, and generation of explanations for results obtained with anomaly detection techniques.

One example embodiment of the invention is directed to a method that may comprise various phases. In an example first phase, a time series dataset containing a set of F features with a respective set of T timestamps is evaluated, and for each feature in the set F, an outlier score is determined. Finally, a numerical matrix $|F|\times|T|$ is created that contains the outlier scores. In an example second phase, boolean transactions may be computed based on the input, that is, the numerical matrix, and items with high support are identified using a frequent pattern mining algorithm. A risk ratio is calculated for each itemset and those itemsets with the best risk ratio, support, and cardinality may be selected. In an example third, and possibly final, phase, association rules related to the itemsets may be computed, and the best itemsets combined with the best association rules, stored. Thresholds may then be mapped to the association rules and feature-value ranges, and these association rules and feature-value ranges then stored as root causes and anomaly explanations, respectively.

When the root cause(s) have been identified, appropriate remediation actions may then be taken that are directed to resolving the root causes. Example root causes that may be resolved by an embodiment include, but are not limited to, attacks such as malware, and non-functional and malfunctioning software and hardware components, such as a sensor for example, such as are typical in environments such as a communications network, and edge computing environments.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in anyway. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that root causes for an anomaly, observed in a dataset, may be determined. In an embodiment, explanations may be provided to support a determination that particular data of a dataset constitute outliers. Various other advantages of one or more embodiments will be apparent from this explanation.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Context for an Example Embodiment

The following is a discussion of a context for an example embodiment. This discussion is not intended to limit the scope of the invention, or the applicability of the embodiments, in any way.

Some conventional approaches are focused on providing a mechanism to properly evaluate AD (anomaly detection) models that are mainly based on the computation of outlier scores. However, there is no known existing framework that exploits the usage of association rules to improve final user explanations and threshold selection of such AD models.

A.1 Explainable AI (XAI)

In general, XAI techniques generally belong to two broad families: model-agnostic methods; and, interpretable models. Model-agnostic methods separate explanations from the Machine Learning (ML) model and provide feature-based explanations, generally based on data perturbation such as SHAP (SHapley additive explanation) and LIME (Local Interpretable Model-agnostic Explanation). More specifically, the explanations, as to how the ML model arrived at its prediction, inference, or other result, are provided in terms of feature importance scores that indicate how much each feature contributes to the prediction made by the ML model.

Conversely, interpretable models, such as GLM (Generalized Linear Models), generate trackable information regarding how the model achieves a particular result, for example, by trained parameters of a Poisson regression. However, in this case, the full comprehension of the anomaly explanations generated is restricted to specialists who are able to understand, for example, the parameters of a regression or the outlier score value computed by the model, for example, distances computed by Matrix Profile, reconstruction error computed by Autoencoder solutions, and energy computed by quantum mechanics approaches. Moreover, none of these techniques are able to provide any kind of root cause explanations for the detected anomalies.

A.2 Frequent Pattern Mining

Frequent pattern mining and association rules are data mining techniques that are used to automatically identify patterns and relationships between variables occurring in a dataset. Together, they are particularly useful techniques that can extract patterns and relationships in large datasets, which are humanly impossible to extract based only on visual analysis of the raw data or outlier scores computed by AD techniques. Frequent pattern mining algorithms aim at finding items or itemsets that occur together regularly and can be done using, for example, the FPGrowth algorithm disclosed in "Han, J. Pei, and Y. Yin. *Mining frequent patterns without candidate generation. In SIGMOD,* 2000" ("Han"), incorporated herein in its entirety by this reference.

A.3 Association Rules

Association rules may take the form of "if-then" statements that represent associations between frequent itemsets. Market basket analysis is one typical application of association rule mining and generally involves identifying relationships among products that significantly occur in customer product purchases.

For example, the association rule "a customer who buys bean, in general buys rice," represented by the form: {bean}=>{rice}, could be extracted from a supermarket database in Brazil. In this case, {bean} is called the antecedent of the rule and {rice} is called the consequent of the rule. The rule {bean}=>{rice} has support s and confidence c if, respectively, s % of the market transactions in the database contain {bean} and {rice}, and c % of the transactions that contain {bean} also contain {rice}. The itemset {bean,rice} is the one that originates the association rule, and may be found by algorithms disclosed elsewhere herein.

Such association rules may be particularly useful to enable better interpretation if relationships between frequent itemsets. One example embodiment of the invention may exploit the benefits of these techniques to uncover hidden patterns and relationships in abnormal data and improve the explainability of detected anomalies. More precisely, the antecedents of the extracted association rules may be regarded as the root-causes of the anomaly, which will be represented as the consequent of the rule.

A.4 Explanation Evaluation and Threshold Selection in Anomaly Detection Techniques Since it is not common to have experts as end-users in many applications, there is a gap in providing straightforward explanations for non-experts who might not understand the ML model and what the parameters/results of the ML model mean. Concomitantly, AD techniques based on the computation of outlier scores do not provide root causes explanations for the detected anomalies. Moreover, to be employed as AD solutions, methods based on outlier scores require definitions of thresholds, which are usually selected based on simple statistical metrics, such as mean, and standard deviation, for example. In this context, an embodiment addresses these problems by providing a framework based on frequent pattern mining and association rules to extract precise explanations and root cause explanations from detected anomalies, using AD algorithms based on outlier scores.

It is noted that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, text files, word processing files, spreadsheet files, and database files, as well as contacts, directories, sub-directories, volumes, and any group of one or more of the foregoing.

Finally, an embodiment may be applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

B. Overview of Aspects of an Example Embodiment

B.1 Introduction

Based on frequent pattern mining and association rules, an example embodiment addresses one or more of the problems disclosed herein by providing a mechanism to extract quantitative and more concise explanations from anomaly detection algorithms that are based on the computation of some sort of outlier value, such as the distances computed by Matrix Profile algorithms. This is useful for [1] characterizing root causes associated to abnormal events and [2] then properly identifying if the abnormal event is a true anomaly, and executing corresponding corrective actions. Concomitantly, this mechanism, according to an embodiment, exploits the usage of association rules to improve the AD precision by adjusting the threshold selection. In an embodiment, the generation of association rules builds upon other work, namely, "U.S. patent application Ser. No.

18/494,523 filed Oct. 25, 2023, titled 'A FRAMEWORK FOR SELECTING THRESHOLDS FOR ANOMALY DETECTION MODELS AND GENERATING QUANTITATIVE EXPLANATIONS.' 2023" ("Threshold Selection Framework") incorporated herein in its entirety by this reference, which leverages itemset frequent mining as a way to assess the quality of explanations given by AD techniques, such as Matrix Profile.

B.2 Aspects of an Example Embodiment

One example embodiment comprises a framework to address limitations of AD models, such as those limitations noted herein, that are based on the computation of outlier scores. In general, this framework, according to one embodiment, exploits a frequent pattern mining solution, known as MacroBase, that is disclosed in "P. Bailis, E. Gan, S. Madden, D. Narayanan, K. Rong, and S. Suri, '*MacroBase: Prioritizing Attention in Fast Data.*' arXiv, Mar. 24, 2017. doi: 10.48550/arXiv.1603.00567," which is incorporated herein in its entirety by this reference.

To provide interpretable explanations of abnormal events, MacroBase adopts a metric from statistical epidemiology called relative risk ratio, which quantifies the probability that a data point is "abnormal", given that it is of a specific combination of features, different from that of the "normal" population. To select combinations of features, MacroBase uses a frequent pattern mining algorithm called FPGrowth (disclosed in Han), setting a minimum support, or minimum frequency, to eliminate rare but non-systemic combinations. One embodiment operates to find frequent combinations of feature-outlier scores that correspond to an abnormal event. Additionally, an embodiment exploits the usage of association rules related to the frequent combinations of feature-outlier scores. By doing so, an embodiment is able to extract further information regarding the occurrence of abnormal events and, consequently, improve the extracted explanations in terms of explainability, conciseness, and precision.

With the foregoing in view, one example embodiment is directed to a method that comprises three phases, as set forth below:

---

PHASE 1
  1.  starts with a time series containing a set of F features and a set of T timestamps;
  2.  for each feature f (f in F) and t (t in T), an embodiment computes an outlier score, using a visual-based interpretable AD technique, such as MatrixProfile for example; and
  3.  returns a numerical matrix |F| × |T| containing outlier scores.

PHASE 2
  1.  executes MacroBase method using the matrix computed in Phase 1 as input:
      a.  computes boolean transactions based on the input matrix;
      b.  executes a Frequent Pattern Mining algorithm, such as FPGrowth, to mine for itemsets with high support, that is, frequent conjunctions of outlier-score ranges;
      c.  computes the risk ratio for each itemset
      d.  sorts the set of itemsets S according to their risk ratio, support, and cardinality, that is, number of conjunctions; and
      e.  selects itemsets with best risk ratio, support, and cardinality.

Phase 3
  1.  computes the association rules related to the set of itemsets S;
      a.  filter the association rules in which at least one abnormal itemset, with best risk ratio, support, and cardinality, selected during PHASE 2, is in the consequent of the rule;
      b.  Sorts the set of association rules according to their metrics, such as confidence, support, antecedent support, consequent support, and leverage;

-continued 2. stores the best itemsets combined with the best association rules as thresholds;
3. maps thresholds to association rules and feature-value ranges; and
4. stores these association rules and feature-value ranges as root causes and anomaly explanations.

As disclosed herein, a useful aspect of one example embodiment concerns the usage of frequent pattern mining combined with association rules to extract more concise and precise explanations from any AD technique based on the computation of outlier scores. Moreover, in an embodiment, association rules related to a detected anomaly enable better interpretation of other events that can be associated to the detected anomalies, namely root causes. For instance, MatrixProfile algorithms return a distance profile, such as a vector of minimum Z-Normalized Euclidean Distances, for the time series used as input. Using the distance profile alone, the explainability is totally based on visual analysis. In most use cases, due to the volume of data and features, it is humanly impossible to detect these associations visually. Among other things then, an embodiment fills this gap by providing a method to automatically detect these associations, which is useful in characterizing root causes associated to abnormal events. This can be used as an additional information to properly identify true anomalies and how to remediate them. Thus, an embodiment may reduce the occurrence of false positive alarms, as illustrated by the practical and illustrated example of usage disclosed herein.

C. Detailed Discussion of Aspects of an Example Embodiment

One example embodiment comprises a framework and/or method, based on frequent pattern mining and association rules for providing precise and root causes explanations for detected anomalies using AD models based on outlier scores. One example framework provides a solution to obtain thresholds for AD techniques and to quantify explicability results for abnormal events root cause(s).

Figure 1B:
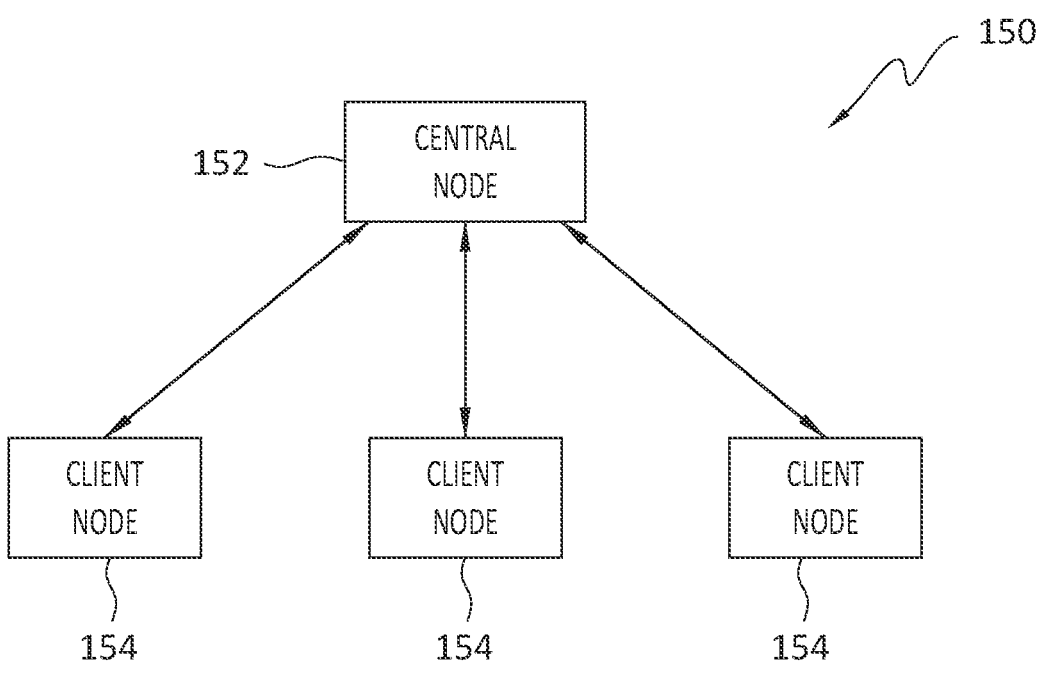
FIG. 1b discloses aspects of an example operating environment for one example embodiment of a framework and method.

With attention now to FIGS. 1a and 1b, an example framework 100 according to one embodiment is disclosed in FIG. 1a. The example framework 100 may be implemented in an environment 150, shown in FIG. 1b, that may comprise, for example, a central node 152 that communicates, such as by receiving data streams from, one or more client nodes 154. In one embodiment, the client nodes 154 may comprise, for example, edge nodes of an edge computing/communications environment. Such edge nodes may comprise any entity, which may comprise software and/or hardware, capable of transmitting a respective stream of data to the central node 152, where such data may, or may not, be generated by the edge node itself and/or by one or more ML models operating at the edge node. Examples of such edge nodes include, but are not limited to, autonomous vehicles, sensors, and IoT (internet of things) devices. The scope of the invention is not, however, limited to any particular implementation environment.

As further indicated in FIG. 1a, the example framework, or method, may comprise a first phase 102 (Phase 1), a second phase 104 (Phase 2), and a third phase 106 (Phase 3). Each of these phases is considered in turn hereafter. In brief, however, in Phase 1, an embodiment may employ an AD algorithm to compute outlier scores from time series. An embodiment may use the AD algorithm MatrixProfile as example to better illustrate the operation of the proposed framework. In Phase 2, an embodiment may extract thresholds per feature, which may be used to identify abnormal entries. Particularly, this information may be used to detect abnormal events, since outlier scores, alone, cannot enable detection of anomalies. In Phase 3, an embodiment may extract the association rules, to identify hidden relationships between features, and create a map between feature-outlier score ranges and feature-value ranges. This is useful in assessing root causes explanations for the detected anomalies and for providing precise explanations based on association rules.

C.1 Phase 1 (102 in FIG. 1a)—Computing Outlier Scores

The first phase 102, or Phase 1, comprises executing an AD algorithm based on outlier scores. The selected algorithm should be capable of computing outlier scores 102a for each feature and timestamp entry of the input time series, which are a set of F features and a set of T timestamps. In other words, for each feature f (f in F), an embodiment may compute the outlier score for each timestamp (t in T) using the selected AD algorithm. This procedure returns a matrix |F|×|T|, containing the outlier scores, which is used in Phase 2, as discussed below.

To demonstrate the framework operation, an embodiment may use the Matrix Profile algorithm in this phase. In this case, the outlier scores are the distance profile, that is, outlier scores, calculated by the algorithm for the time series used as input. However, any AD algorithm based on the computation of outlier scores may be employed in this Phase 1. The output generated during this process is used in Phase 2, which is described next.

C.2 Phase 2 (104 in FIG. 1a)—Extracting Important Features and Threshold Ranges After computing the outlier scores 102a, an embodiment may then execute the MacroBase method using the outlier scores as input in order to extract important features and threshold ranges. To this end, considering that the ground truth is available during the training process, an embodiment may first compute boolean transactions 104a for normal and abnormal records, based on the outlier scores computed during Phase 1. Following the discretization procedure disclosed in Threshold Selection Framework, the outlier scores for each feature may be divided into bins, the number of which may be user-defined. These bins will represent respective discrete threshold ranges. In this case, these boolean transactions of items, which may be feature-value ranges or just bins, per timestamp are analogous to a market basket analysis problem, a metaphor for a group of items purchased by a customer, either in a single transaction or over time in a sequence of transactions.

Figure 2:
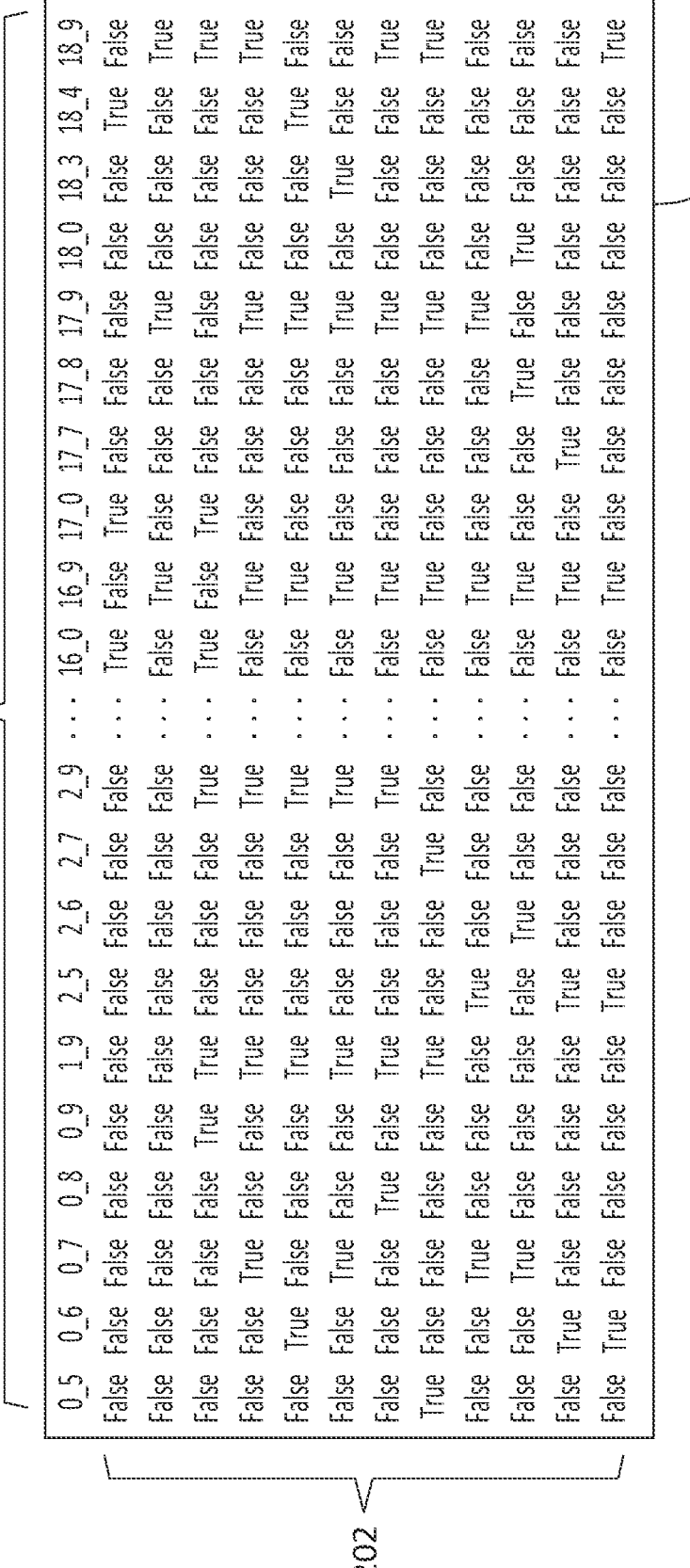
FIG. 2 discloses aspects of some example Boolean transactions.

FIG. 2 discloses a matrix 200 of boolean transactions computed based on the output of Matrix Profile over a time series dataset. Each row 202 corresponds to a timestamp, each column 204 corresponds to a given item, in the format of <feature_id>_<bin_id>, and each value 'True' or 'False' indicates the presence/absence of an item. For instance, in FIG. 2, the 'False' value in the first column 204 and first row 202 indicates the absence of item 0_5 (bin 5 of feature 0).

To reduce the number of Boolean transactions, an embodiment may set a sufficient risk ratio (alpha) and outlier minimum support (sigma) per feature. The minimum risk ratio is also a predefined parameter that is used to consider only the transactions with a sufficient risk ratio. This metric came from statistical epidemiology, which describes the relative occurrence of key features, such as age or sex for example, among infected and healthy populations. One embodiment may describe the relative occurrence of key features among normal and abnormal events given a feature-value range (feature-bin) combination. The risk ratio may be computed using the following equation:

$$\text{risk ratio} = \frac{n_{outliers}/(n_{outliers} + n_{inliers})}{m_{outliers}/(m_{outliers} + m_{inliers})}$$

where $n_{outliers}$ is the number of occurrences in outliers and $n_{inliers}$ is the number of occurrences in inliers among normal events; $m_{outliers}$ is the number of occurrences in outliers and $m_{inliers}$ is the number of occurrence in inliers among abnormal events, that is, each entry (timestamp) are separated according to the ground truth. Also, the outlier support is a user-defined parameter between 0 and 1, that is useful to optimize the frequent pattern mining process.

The frequent itemsets may be computed using a Frequent Pattern Mining (FPM) 104*b* algorithm, such as FPGrowth. The FPM algorithm returns itemsets, that is, conjunctions of bins, that have both (1) support greater or equal to sigma and (2) risk ratio greater or equal to alpha, where minimum support and risk ratio may be defined by a user, respectively. These parameters consider only frequent conjunctions by removing conjunctions of bins corresponding to rare and non-systemic combinations. After computing the itemsets 104*b*, their risk respective ratios are computed 104*c*. Then, the itemsets are ordered 104*d*, or sorted, (descending) according to risk ratio, support, and cardinality, and the best itemset is selected (first element) 104*e*.

Figure 3:
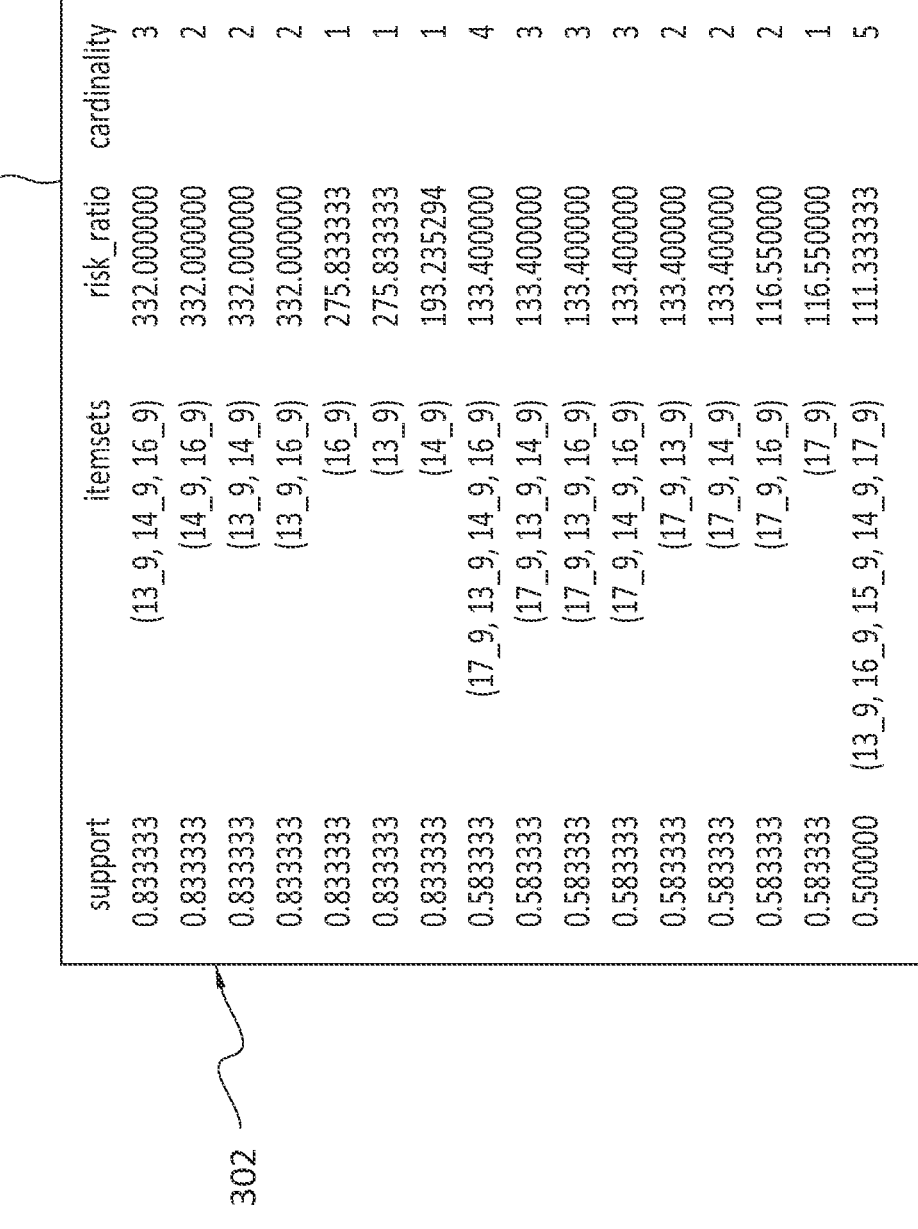
FIG. 3 discloses examples of frequent itemsets.

An example of an ordered list 300 of itemsets is disclosed in FIG. 3. In this example, an itemset is analogous to a market basket containing different items. In FIG. 3, the first row 302 can be interpreted as a basket that includes three items, namely, 13_9 (bin 9 of feature 13), 14_9 (bin 9 of feature 14), 16_9 (bin 9 of feature 16). In the illustrative example of FIG. 3, the itemset in row 302 is the best itemset, in other words, the three above-mentioned feature-bin combinations can be used to identify abnormal events. Each feature present in the selected itemset, that is, the most relevant features for identifying anomalies, and its respective outlier score range, or threshold, may then be used to form association rules 106*a* in Phase 3. This procedure thus composes the explanations for the anomalies along with their root causes.

C.3 Phase 3 (106 in FIG. 1*a*)—Computing Explanations and Explainability Metrics This phase 106 initiates with a set containing all frequent itemsets and a dictionary of important features along with the outlier score ranges computed during Phase 2. Following is a description of how an embodiment may compute, and use, association rules as the final explanations for AD algorithms and the benefits of using association rules to explain detected anomalies.

C.3.1 Computing Association Rules and Composing Final Explanations for AD Alg In Phase 2, based on the frequent itemsets and association rules, an embodiment may extract user friendly explanations by creating a map between feature-outlier score ranges and feature-value ranges for the important features and anomaly root causes. Using a procedure, such as that disclosed in Threshold Selection Framework, a dictionary 400 of relevant features along with their respective value ranges, shown in FIG. 4, may be created using the most frequent itemset obtained in Phase 2. However, an embodiment may first compute 106*a* the association rules using the set containing all frequent itemsets before composing the final explanation. Note that in FIG. 4, the example explanation disclosed there is based only on frequent itemsets, that is, the frequency of the itemsets.

As disclosed earlier herein, an association rule generation is an additional task that can be employed after mining frequent itemsets. An association rule is an implication expression of the form X→Y (that is, "if X then Y"), where X and Y are disjoint itemsets. For instance, in one example anomaly detection use case, an example of an association rule can be {16_9}→{14_9}, that is, "if {16_9} (bin 9 of feature 9), then {14_9} (bin 9 of feature 14)." In other words, this association rule suggests that 16_9 (bin 9 of feature 16) is a possible root cause for 14_9 (bin 9 of feature 14), that is, that there is a strong relationship between these itemsets.

In order to extract the association rules, any association rule algorithm can be employed. The rule generation method can be based on different existent metrics, such as confidence and lift. These metrics may be used to evaluate the "interest" of the association rules. For example, an embodiment may employ the confidence metric, which is a metric based on the support, as discussed above. The confidence of a given rule XàY represents the probability of the consequent (Y) in a transaction, given that the transaction also contains the antecedent (X). To illustration, the confidence is '1' for a rule XàY if the consequent and the antecedent always occur together.

Figure 5:
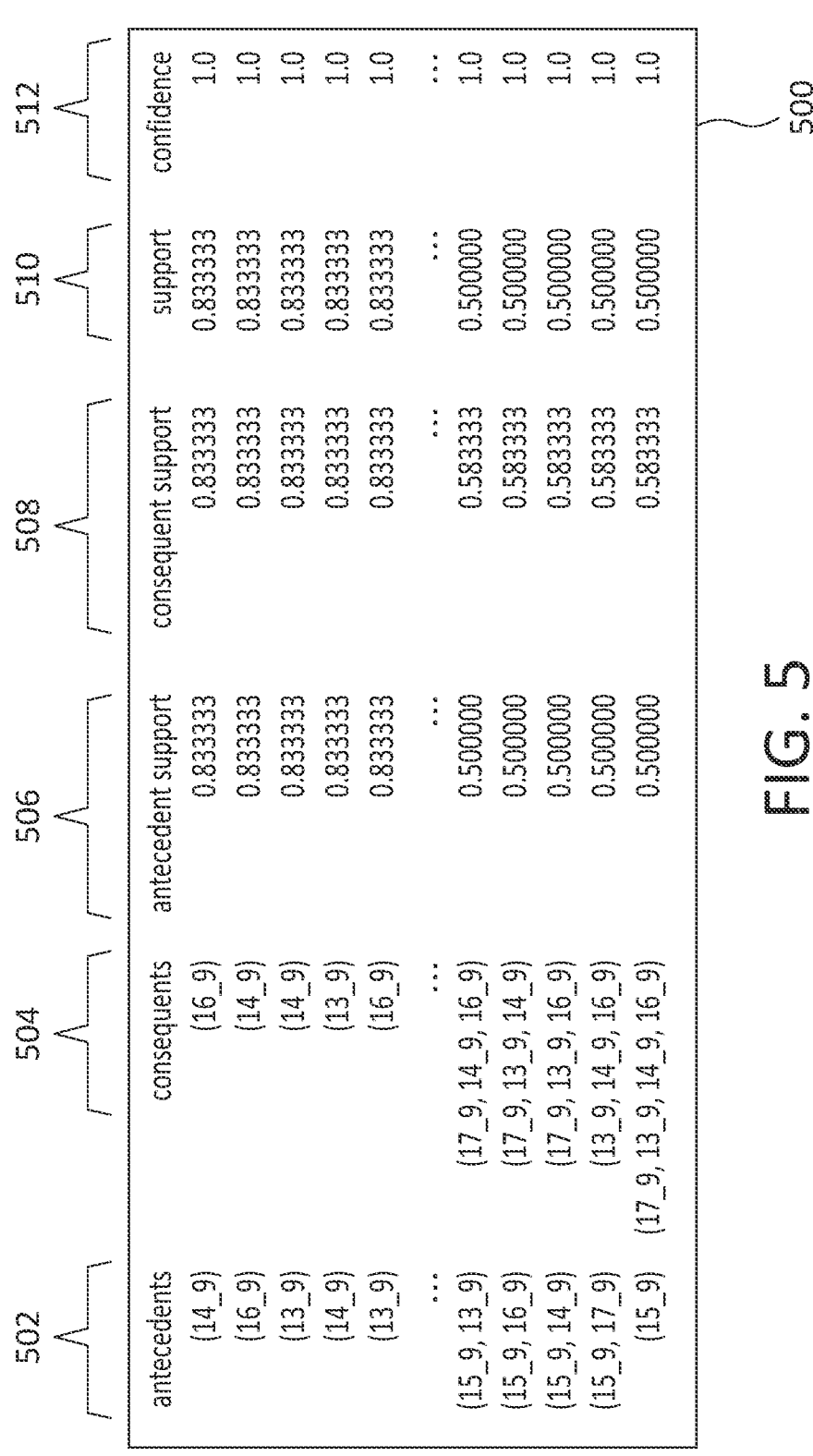
FIG. 5 discloses an example set of association rules containing the antecedent and consequent itemsets and their respective metrics, according to an embodiment.

With the foregoing discussion in view, attention is directed now to FIG. 5 which discloses an example set 500 of association rules containing the antecedent 502 and consequent 504 itemsets, along with their respective metrics 506 and 508, aggregate support 510, and confidence score 512. This example set of association rules may be filtered 106*b* in order to show only relevant rules. An embodiment may consider a rule as relevant if the set of consequents contains at least one important feature, that is, for example, one itemset from the best itemset obtained during Phase 2.

To illustrate a possible application of these rules, an embodiment may sort 106*c* the association rules and select the "best rule"—in one example, the best rule is a relevant association rule with greater/greatest support, antecedent/consequent support, and confidence—and then use that best rule to improve the original explanation that was generated based solely on frequent itemsets (as in the example of FIG. 4). It is noted that this is simply an illustrative example, and in an embodiment, it is possible to use multiple association rules combined with important features. In an embodiment, the best itemsets and the best association rules may be stored 106*d* to serve as thresholds.

Figure 7:
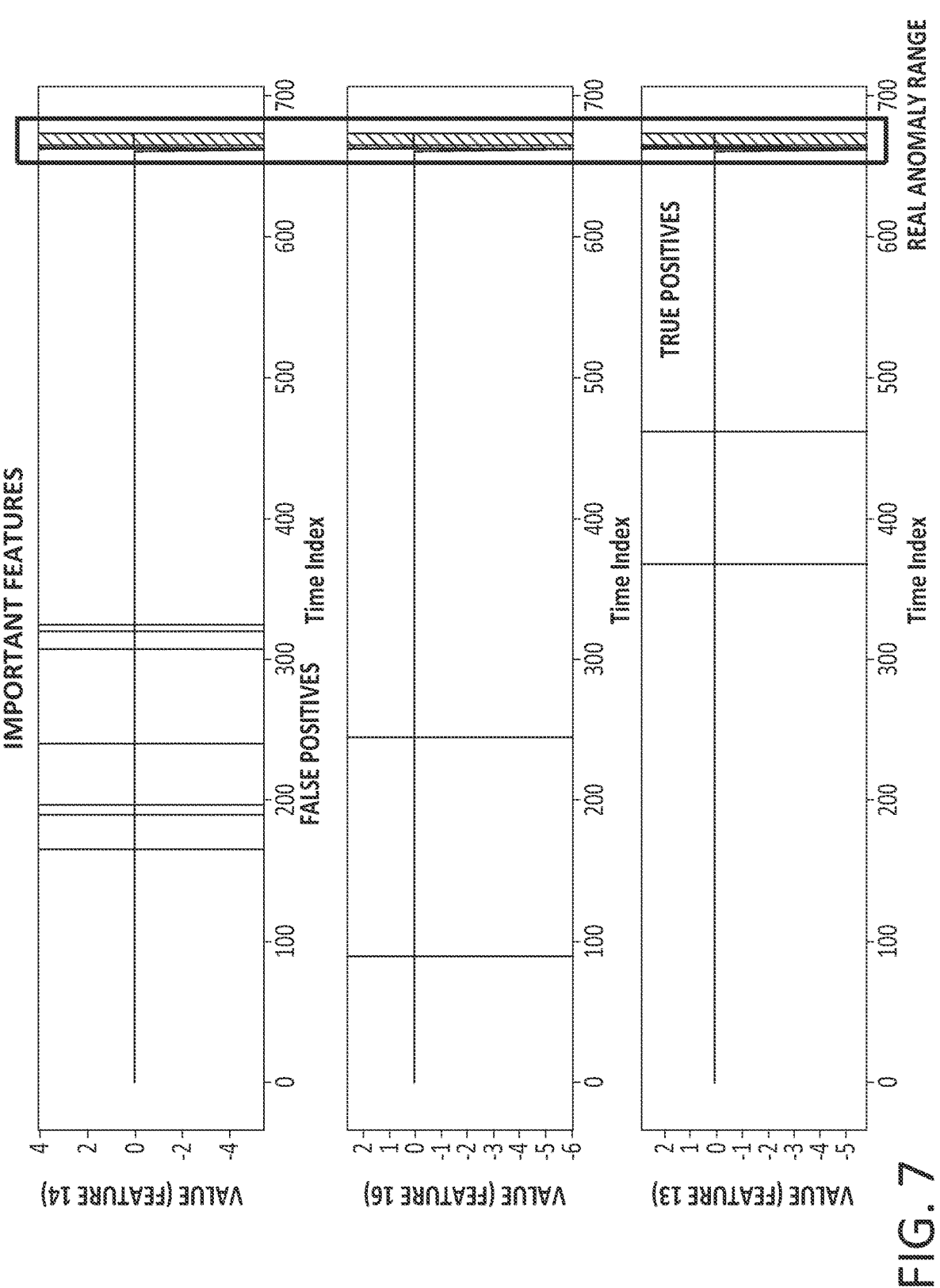
FIG. 7 discloses a series of graphs illustrating aspects of an AD explainability evaluation performed without using association rules.

In an embodiment, a final explanation 600, as disclosed in FIG. 6, may be composed of the original important features obtained based on the frequent itemsets and the best relevant association rule, that is, the antecedent and consequent features along with their respective ranges, as illustrated in FIG. 7. For instance, if the AD algorithm is a Matrix Profile algorithm, the mapping procedure 106*e*, that is, mapping between feature-outlier score ranges and feature-value ranges, can be performed by executing the operations discussed below.

In more detail, and given data structures containing (i) outlier scores and (ii) the indices indicating which subsequence, of the time series, is associated to the given outlier scores, for each feature f (f in F), the following mapping procedure 106e may be performed:

1. receives as input the threshold intervals calculated in Phase 2;
2. filters the timestamp indexes of the distance profile that present values within the threshold intervals;
3. obtain the subsequences related to these timestamp indexes; and
4. the feature-value range will be composed of the minimum (lower bound) and maximum (upper bound) values present in the selected subsequences.

After this mapping procedure 106e, these important feature-value ranges may be stored. In one example use case, they are stored as a dictionary of relevant features and the chosen association rule with their respective value ranges. With these ranges as explanations, it is possible, as shown at 106f, to [1] understand why an event is classified as an anomaly and [2] then identify possible root causes for this abnormal event. An embodiment may apply the association rule-value ranges as a predicting algorithm to detect anomalies more precisely in any time series, as explained in more detail elsewhere herein. In the next section, a description is provided as to how association rules can be used and demonstrate how it can reduce the occurrence of false positive alarms by providing practical and illustrative examples of usage.

C.3.2 Application/Benefits of Association Rules in Explaining AD Algorithms

Given a previously unseen time series, it will be classified as abnormal only if the antecedent and consequent of the association rule is satisfied. There is a higher chance of generating false positive alerts if the AD explanation evaluation is done without the association rules.

Figure 8:
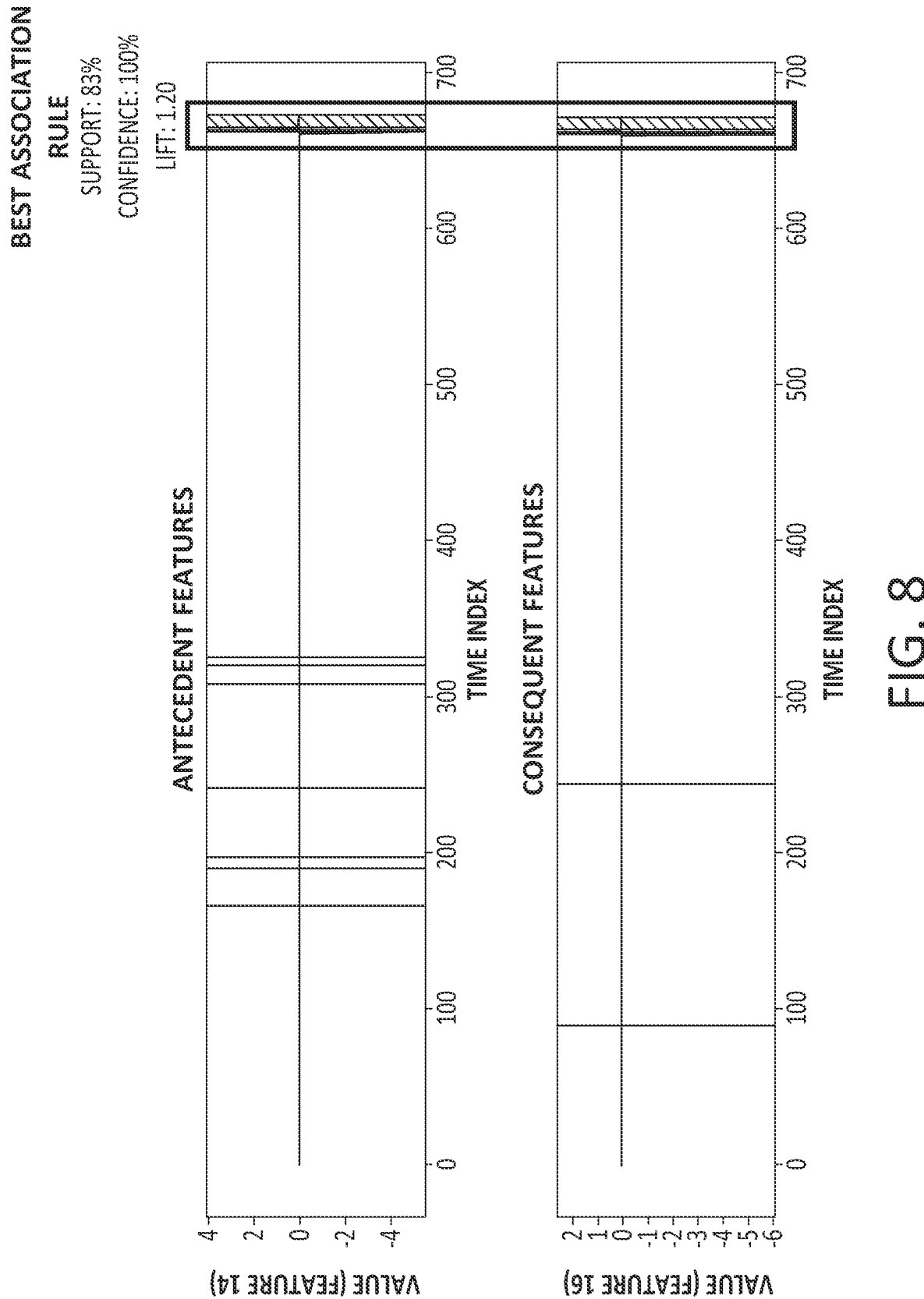
FIG. 8 discloses a series of graphs illustrating an example of an association rule $\{14\_9\}$ à $\{16\_9\}$ (if "bin 9 of feature 14" then "bin 9 of feature 16"), according to an embodiment.
Figure 9:
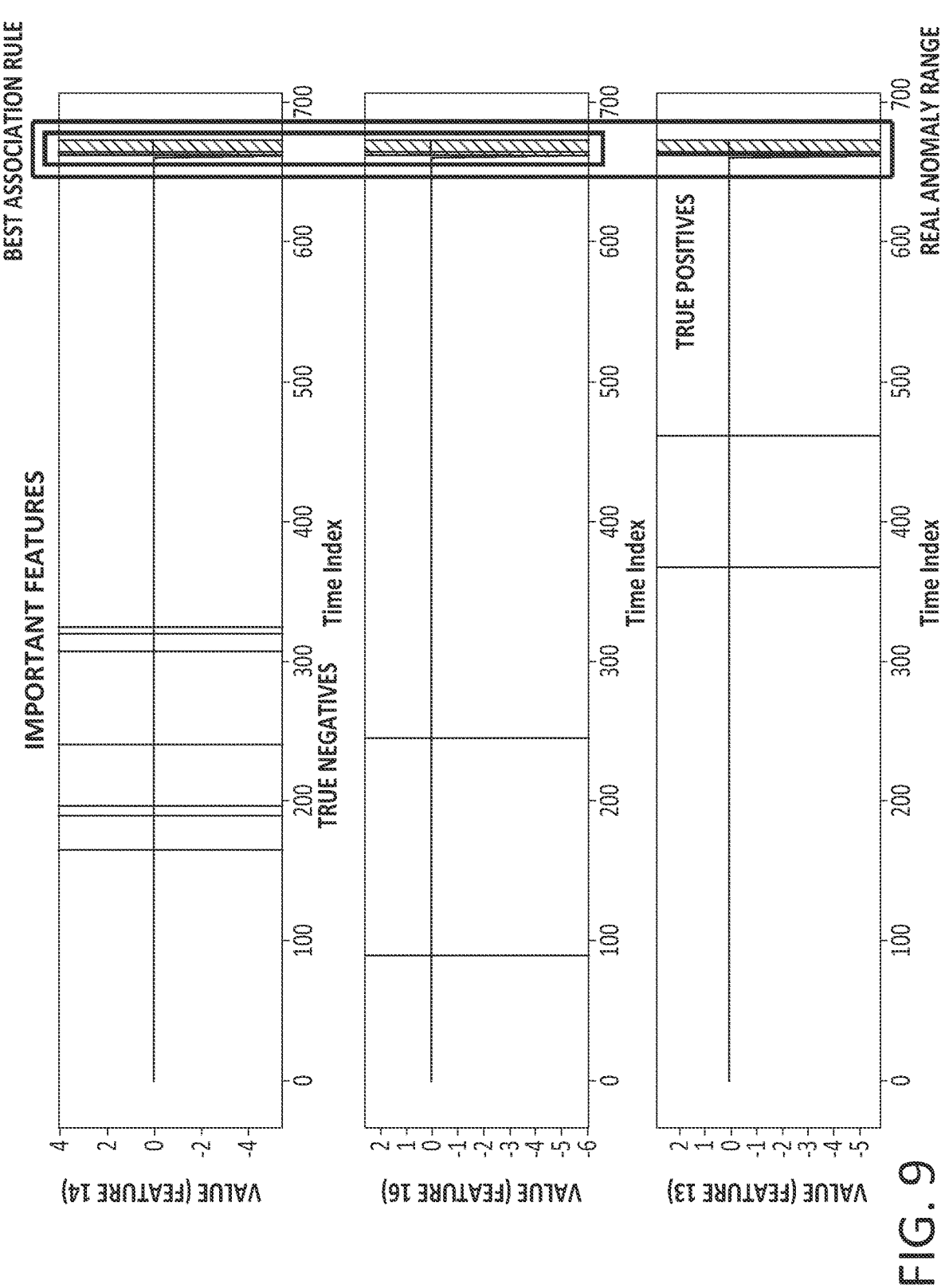
FIG. 9 discloses a series of graphs illustrating an example of an AD explainability evaluation that was performed using association rules, according to an embodiment, where the evaluation indicates improvements on accuracy by avoiding false positive alarms.

As an example, FIG. 7 (AD explainability evaluation without using association rules) illustrates an example scenario with multiple false positives when the important features are 13, 14, and 16, without considering any association rule during the explainability performance evaluation. FIG. 8 (example of an association rule [14_9] à [16_9] (if "bin 9 of feature 14" then "bin 9 of feature 16")) illustrates the association rule used as an example in the previous section ({14_9} à {16_9}). In this case, the rule is satisfied if both itemsets are present in the same timestamp. If this rule is considered when evaluating the performance metrics of the AD explainability, false positive alerts can be avoided, as shown in FIG. 9 (AD explainability evaluation using association rules—improvements on accuracy by avoiding false positive alarms). In this example, it is evident the performance gain in accuracy.

Note that this is only one example of how association rules can be exploited in providing explainability for AD algorithms. It is also possible to use multiple association rules combined with important features, for example.

D. Experiments and Results

Following is a discussion of an experiment that was conducted to demonstrate that the use of association rules, according to one embodiment, can improve the explainability metrics of AD algorithms, at least in terms of conciseness, consistency, and accuracy, using an open source AD benchmark for explicability, such as the example AD benchmark disclosed in "V. Jacob, F. Song, A. Stiegler, B. Rad, Y. Diao, and N. Tatbul, *"Exathlon: A Benchmark for Explainable Anomaly Detection over Time Series"* (2021) ("Jacob"), incorporated herein in its entirety by this reference, while providing useful explanations regarding root causes for detected anomalies.

D.1 Benchmark

The dataset employed in the experiments was constructed based on real data traces collected from a use case scenario implemented on Apache Spark. This dataset is composed of data generated by Spark streaming applications, for instance, an application that counts the number of clicks for each user within the last batch. The data collected from each execution of an application comprises a Trace, which can be disturbed or undisturbed, that is, the data may or may not contain the presence of abnormal events.

In order to create an anomaly detection benchmark, that is, a dataset with ground truths for all existing anomalies, or disturbed traces, this dataset was generated with injected anomalies. To this end, the inventors generated undisturbed traces to characterize the normal execution behavior and then injected several anomalous events to generate disturbed traces. In the experiment, a dataset was employed that contains three types of disturbed traces, namely:

1. Bursty input: this type of anomaly injection simulates input rate spikes—to create this kind of disturbed trace, a disruptive event generator (DEG) is executed to temporarily increase the input rate during 15 to 30 minutes;
2. Bursty input until crash: this is an extended version of the bursty input category—in this case, the DEG period runs until crashing due to lack of memory; and
3. Driver/executor failure: this category represents anomalies dure to hardware faults or maintenance operations that may cause a node to fail abruptly, turning all processes unreachable—this anomaly was injected by reducing the number of processed records to 0 until the driver comes back up again after 20 seconds (and 10 seconds in the case of executor failure).

An embodiment of the framework was evaluated using traces from a stream processing application containing 19 features, comprising disturbed traces from the three categories described above. Further details regarding the dataset used in the experiments are disclosed in Jacob. The results are presented in the following discussion.

D.2 Results

As noted above, an embodiment of the disclosed framework was implemented in the experiment using Matrix Profile as the AD algorithm based on outlier scores. The results, namely, extracted performance metrics, obtained for the stream processing application, containing the disturbed traces previously mentioned herein, are summarized in the table disclosed in FIG. 10. The columns of that table indicate the average of the explanation metrics for conciseness and consistency, in terms of precision, recall, and F1 score, recalling that conciseness corresponds to the number of features used in the explanation.

For a global explanation, which may comprise a set of explanations, the conciseness measure is the average of the size of each explanation. Consistency evaluates if anomalies of the same type occurring in a similar context have consistent explanation, that is, the relevant features are the same in similar situations. Finally, accuracy is measured using the explanations of an anomaly as thresholds for the outlier scores computed for a previously unseen time series, and then evaluating the accuracy of such predictions.

Using an embodiment of the disclosed framework, the inventors were able to provide more concise, consistent, and precise, explanations for the outlier scores computed by Matrix Profile. In contrast, there is no known approach that uses association rules to compose explanations for AD algorithms, which may be used to identify root causes of abnormal events. Analyzing the results presented in the table in FIG. 10, it can be seen that implementing Matrix Profile with association rules is about 15% more concise, while also presenting better consistency as well, as compared with the use of Matrix Profile alone.

Given that the experiment used 19 features, and the explanations resulted in only 3.13 features on average, the explanations provided are highly concise relative to the number of features considered. Also, it is noteworthy that the conciseness metric should be analyzed together with consistency. Humans usually prefer concise explanations, that is, usually conciseness should favor smaller, and thus simpler explanations which are easier for humans to understand. Also, it is noted that conciseness has a direct impact on the consistency metric. With the results of the experiment, it can be seen that the lack of conciseness of Matrix Profile without the usage of association rules resulted in a poor consistency as compared with the use of Matrix Profile+association rules.

Finally, considering the accuracy metrics (precision, recall, and F1 score) computed with cross validation procedure, the experiment demonstrated an improvement in the precision, due to the usage of the association rules. However, usage of the rules in this particular experiment directly impacted the average recall. In this context, it can be seen that the association rules may be used as an additional lever for explaining abnormal events. A stricter approach to implementation of the usage rules may be employed, as in the experiment, in order to avoid false positives or more relaxed in order to avoid false negatives. In other words, there is a trade-off to be analyzed, depending upon the particular use case under consideration.

Providing a large number of false positive occurrences can generate an overhead for personnel such as network administrators. On the one hand, solutions with strict security constraints must not miss abnormal events, and optimizing true positive rates can be considered a priority when compared to minimizing false positives. Even considering such a scenario, providing root cause explanations for detected anomalies can be particularly useful for security/ZT use cases since the association rules can assist the procedures, implemented to remediate the effects of abnormal events, in the anomaly root cause(s) along with their important features. In other words, it can also be seen as an additional information for remediating anomalies in general. Lastly, it is noted once again that an embodiment of the disclosed framework can be used with any outlier score-based AD algorithm.

E. Example Methods

It is noted with respect to the disclosed methods, including the example method of FIG. 1a, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

F. Further Example Embodiments

Following are some further example embodiments of the invention. These are presented only by way of example and are not intended to limit the scope of the invention in any way.

Embodiment 1. A method, comprising: evaluating a set of itemsets; based on the evaluating, computing association rules corresponding to the itemsets; filtering the association rules to identify relevant association rules; sorting the relevant association rules according to their respective metrics of support, confidence, lift, and conviction, and the relevant association rules are sorted from best metrics to worst metrics; storing (1) best itemsets of the set of itemsets, and (2) the association rules with the best metrics, as thresholds; mapping the thresholds to the stored association rules and to feature-value ranges; and identifying the stored association rules and the feature-value ranges as root causes of an anomaly, and explanations of the anomaly, respectively.

Embodiment 2. The method as recited in claim 1, wherein each of the itemsets in the set is associated with a respective value of risk ratio, support, and cardinality.

Embodiment 3. The method as recited in claim 1, wherein each of the association rules comprises a respective antecedent, and a respective consequent that is associated with the antecedent.

Embodiment 4. The method as recited in claim 1, wherein each of the association rules has a respective support 's' and confidence 'c.'

Embodiment 5. The method as recited in claim 1, wherein the root causes of the anomaly and the explanations of the anomaly are used to identify, and implement, a remedial action to resolve the anomaly.

Embodiment 6. The method as recited in claim 1, wherein the anomaly is identified by an anomaly detection machine learning model as a result of analysis, by the anomaly detection machine learning model, of time-series data that comprises a set of features ('F') and a set of timestamps ('T').

Embodiment 7. The method as recited in claim 1, wherein the explanations of the anomaly indicate how and/or why the anomaly was identified as such by an anomaly detection machine learning model.

Embodiment 8. The method as recited in claim 1, wherein the itemsets in the set were obtained using a frequent pattern mining process.

Embodiment 9. The method as recited in claim 1, wherein the association rules are related to combinations of feature-outlier scores.

Embodiment 10. The method as recited in claim 1, wherein the support metric indicates a relative frequency of conjunctions of outlier-score ranges.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 11:
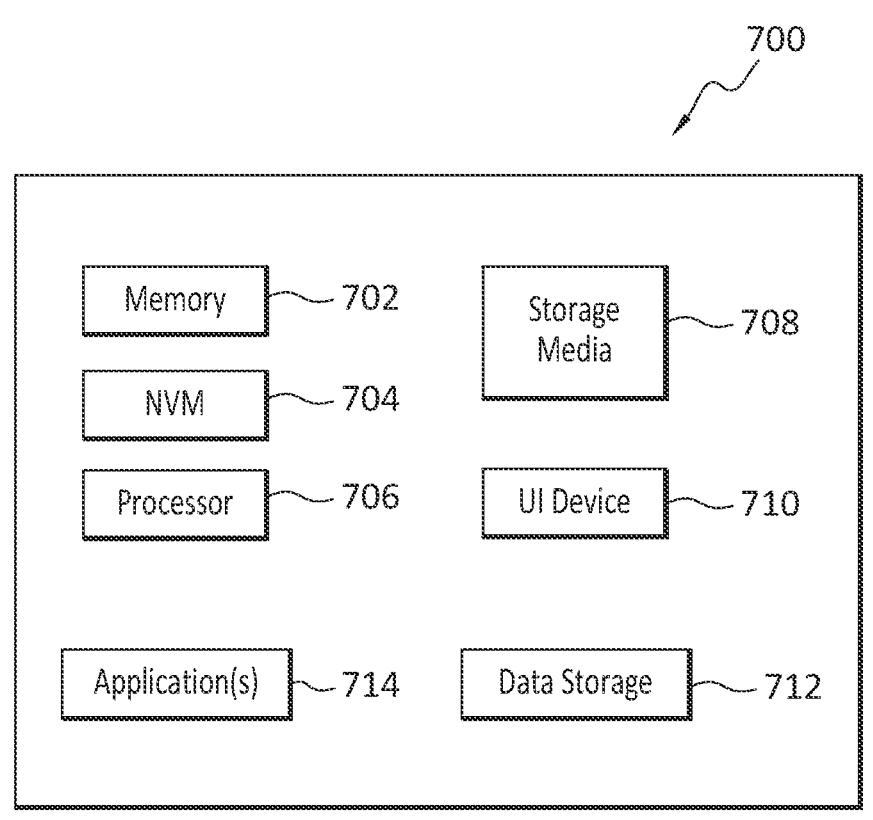
FIG. 11 discloses an example computing entity configured and operable to perform any of the disclosed methods, processes, and operations.

With reference briefly now to FIG. 11, any one or more of the entities disclosed, or implied, by FIGS. 1a-10, and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 11.

In the example of FIG. 11, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 719, and data storage 712. One or more of the memory components 702 of the physical computing device 700 may take the form of solid state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   generating, by one or more hardware processors, a set of itemsets from boolean transactions generated from discretized outlier-score ranges computed for features of a time-series dataset by an anomaly detection model evaluating, by the one or more hardware processors, the set of itemsets;

based on the evaluating, computing association rules corresponding to the itemsets, wherein the itemsets are filtered to include itemsets having at least a predefined risk ratio, support, and cardinality indicative of abnormal events;

filtering the association rules to identify relevant association rules whose consequents include at least one itemset associated with an abnormal event;

sorting the relevant association rules according to their respective metrics including support, confidence, lift, and conviction to identify one or more association rules satisfying anomaly explanation criteria;

storing (1) best itemsets selected based on risk ratio, support, and cardinality, and (2) the association rules satisfying the anomaly explanation criteria, as multi-feature anomaly detection thresholds;

mapping the multi-feature anomaly detection thresholds to the stored association rules and to feature-value ranges by identifying, for each feature, subsequences of the time-series dataset having outlier scores within threshold ranges and determining corresponding feature-value ranges;

identifying the stored association rules as root causes of an anomaly and the corresponding feature-value ranges as explanations of the anomaly; and detecting the anomaly by evaluating antecedent and consequent conditions of at least one stored association rule and determining that the anomaly is present based on satisfaction of both the antecedent and consequent conditions.

2. The method as recited in claim 1, wherein each of the itemsets in the set is associated with a respective value of risk ratio, support, and cardinality.

3. The method as recited in claim 1, wherein each of the association rules comprises a respective antecedent, and a respective consequent that is associated with the antecedent.

4. The method as recited in claim 1, wherein each of the association rules has a respective support 's' and confidence 'c'.

5. The method as recited in claim 1, wherein the root causes of the anomaly and the explanations of the anomaly are used to identify, and implement, a remedial action to resolve the anomaly.

6. The method as recited in claim 1, wherein the anomaly is identified by an anomaly detection machine learning model as a result of analysis, by the anomaly detection machine learning model, of time-series data that comprises a set of features ('F') and a set of timestamps ('T').

7. The method as recited in claim 1, wherein the explanations of the anomaly indicate how and/or why the anomaly was identified as such by an anomaly detection machine learning model.

8. The method as recited in claim 1, wherein the itemsets in the set were obtained using a frequent pattern mining process.

9. The method as recited in claim 1, wherein the association rules are related to combinations of feature-outlier scores.

10. The method as recited in claim 1, wherein the support metric indicates a relative frequency of conjunctions of outlier-score ranges.

11. A non-transitory storage medium having stored therein instructions that are executable by one or more hardware processors to perform operations comprising:

generating, by one or more hardware processors, a set of itemsets from boolean transactions generated from discretized outlier-score ranges computed for features of a time-series dataset by an anomaly detection model evaluating, by the one or more hardware processors, the set of itemsets;

based on the evaluating, computing association rules corresponding to the itemsets, wherein the itemsets are filtered to include itemsets having at least a predefined risk ratio, support, and cardinality indicative of abnormal events;

filtering the association rules to identify relevant association rules whose consequents include at least one itemset associated with an abnormal event;

sorting the relevant association rules according to their respective metrics including support, confidence, lift, and conviction to identify one or more association rules satisfying anomaly explanation criteria;

storing (1) best itemsets selected based on risk ratio, support, and cardinality, and (2) the association rules satisfying the anomaly explanation criteria, as multi-feature anomaly detection thresholds;

mapping the multi-feature anomaly detection thresholds to the stored association rules and to feature-value ranges by identifying, for each feature, subsequences of the time-series dataset having outlier scores within threshold ranges and determining corresponding feature-value ranges;

identifying the stored association rules as root causes of an anomaly and the corresponding feature-value ranges as explanations of the anomaly; and detecting the anomaly by evaluating antecedent and consequent conditions of at least one stored association rule and determining that the anomaly is present based on satisfaction of both the antecedent and consequent conditions.

12. The non-transitory storage medium as recited in claim 11, wherein each of the itemsets in the set is associated with a respective value of risk ratio, support, and cardinality.

13. The non-transitory storage medium as recited in claim 11, wherein each of the association rules comprises a respective antecedent, and a respective consequent that is associated with the antecedent.

14. The non-transitory storage medium as recited in claim 11, wherein each of the association rules has a respective support 's' and confidence 'c'.

15. The non-transitory storage medium as recited in claim 11, wherein the root causes of the anomaly and the explanations of the anomaly are used to identify, and implement, a remedial action to resolve the anomaly.

16. The non-transitory storage medium as recited in claim 11, wherein the anomaly is identified by an anomaly detection machine learning model as a result of analysis, by the anomaly detection machine learning model, of time-series data that comprises a set of features ('F') and a set of timestamps ('T').

17. The non-transitory storage medium as recited in claim 11, wherein the explanations of the anomaly indicate how and/or why the anomaly was identified as such by an anomaly detection machine learning model.

18. The non-transitory storage medium as recited in claim 11, wherein the itemsets in the set were obtained using a frequent pattern mining process.

19. The non-transitory storage medium as recited in claim 11, wherein the association rules are related to combinations of feature-outlier scores.

20. The non-transitory storage medium as recited in claim 11, wherein the support metric indicates a relative frequency of conjunctions of outlier-score ranges.

* * * * *